(12) United States Patent
Slavens, Jr. et al.

(10) Patent No.: US 9,938,904 B2
(45) Date of Patent: Apr. 10, 2018

(54) METHOD OF CONTROLLING A GAS TURBINE ENGINE USING REAL-TIME COMPONENT TEMPERATURE DATA

(71) Applicant: UNITED TECHNOLOGIES CORPORATION, Farmington, CT (US)

(72) Inventors: Thomas N. Slavens, Jr., Vernon, CT (US); Charles W. Halderman, Simsbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 472 days.

(21) Appl. No.: 14/572,427

(22) Filed: Dec. 16, 2014

(65) Prior Publication Data

US 2015/0176502 A1 Jun. 25, 2015

Related U.S. Application Data

(60) Provisional application No. 61/918,964, filed on Dec. 20, 2010.

(51) Int. Cl.
*F02C 9/28* (2006.01)

(52) U.S. Cl.
CPC .......... *F02C 9/28* (2013.01); *F05D 2270/303* (2013.01)

(58) Field of Classification Search
CPC ...... F02C 9/00; F02C 9/26; F02C 9/28; F05D 2270/303; F05D 2270/3032
USPC ............................................................ 60/772
See application file for complete search history.

(56) References Cited

U.S. PATENT DOCUMENTS

| | | | | |
|---|---|---|---|---|
| 3,663,118 A * | 5/1972 | Johnson | ................ | F01D 17/162 415/116 |
| 4,582,426 A * | 4/1986 | Douglas | ................ | F01D 17/085 356/43 |
| 4,815,928 A * | 3/1989 | Pineo | ...................... | F01D 5/081 415/115 |
| 5,042,295 A * | 8/1991 | Seeley | ...................... | G07C 3/00 701/100 |
| 5,226,731 A * | 7/1993 | Allen | .................... | F01D 17/085 356/43 |
| 5,305,599 A * | 4/1994 | Marvin | ..................... | F02K 1/15 60/226.3 |
| 5,623,823 A * | 4/1997 | Schirle | ...................... | F02K 3/06 415/144 |
| 6,758,199 B2 * | 7/2004 | Masters | .................. | F02P 9/002 123/620 |
| 7,313,485 B2 * | 12/2007 | Plotts | .................. | G01N 17/006 702/22 |

(Continued)

*Primary Examiner* — Phutthiwat Wongwian
*Assistant Examiner* — Loren Edwards
(74) *Attorney, Agent, or Firm* — Cantor Colburn LLP

(57) ABSTRACT

A device and methods are provided for controlling a gas turbine engine based at least in part on real-time detection of spatially resolved temperature distributions of a turbine engine components. In one embodiment, a method includes detecting surface temperature of one or more blade elements, by an thermal probe, in a plurality of radial locations of an airfoil row to determine real-time spatially resolved surface temperature data for the one or more blade elements of the airfoil row, and controlling the engine based on the real-time spatially resolved surface temperature data.

22 Claims, 6 Drawing Sheets

(56) References Cited

U.S. PATENT DOCUMENTS 7,762,153 B2 * 7/2010 Hoyte ................... G01M 13/00
  73/116.03
2011/0072827 A1 * 3/2011 Ciofini ................... F01D 5/082
  60/772

* cited by examiner

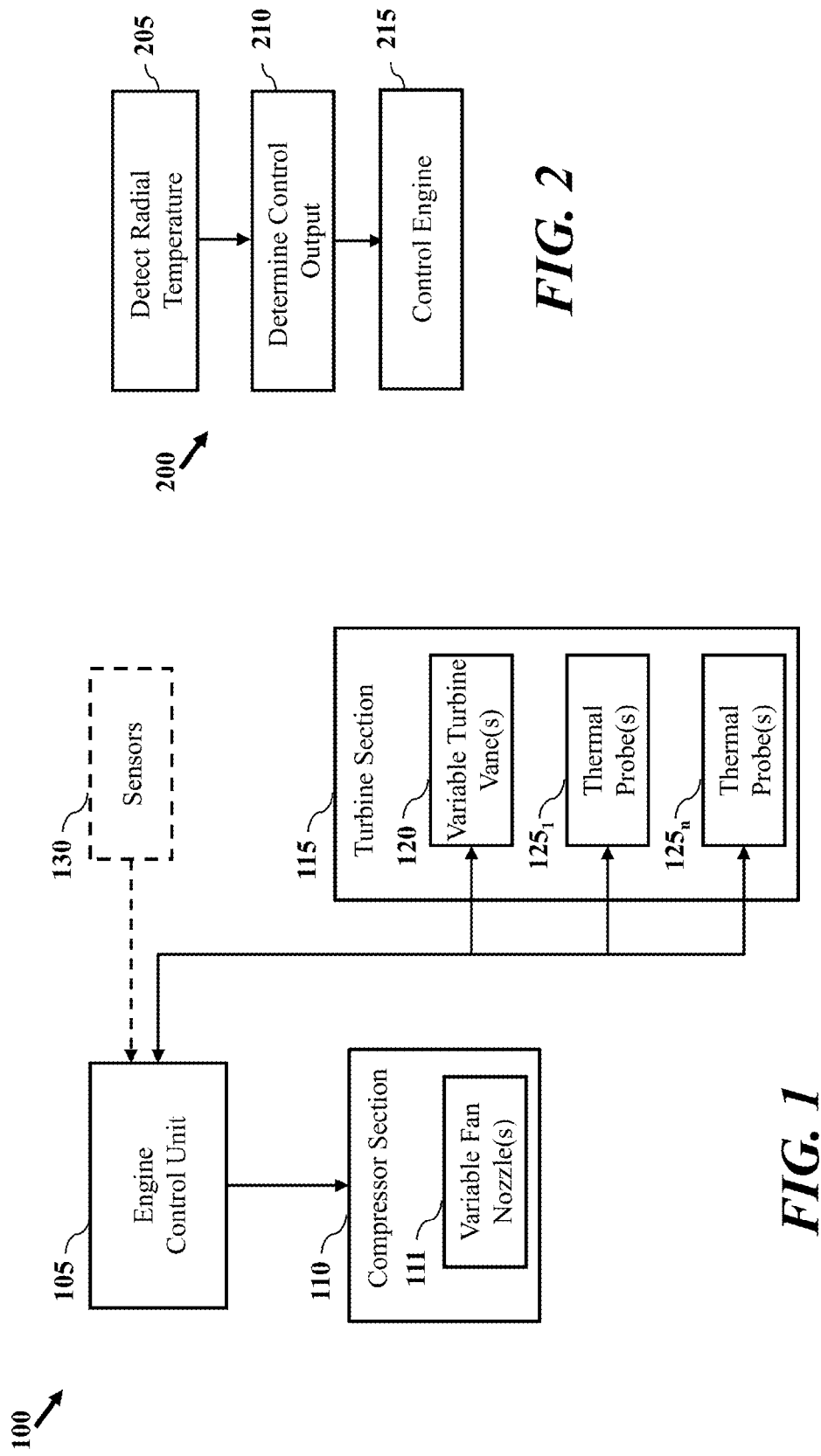

METHOD OF CONTROLLING A GAS TURBINE ENGINE USING REAL-TIME COMPONENT TEMPERATURE DATA

CROSS-REFERENCE TO RELATED APPLICATIONS

This application claims priority to U.S. Provisional Application No. 61/918,964 filed on Dec. 20, 2013 and titled Method of Controlling a Gas Turbine Engine Using Real-Time Component Temperature Data, the disclosure of which is hereby incorporated by reference in its entirety.

FIELD

The present disclosure relates generally to gas turbine engines, and more particularly to methods and devices for controlling engine operation.

BACKGROUND

In the pursuit of ever higher efficiencies, gas turbine manufacturers have long relied on higher turbine inlet temperatures to provide boosts to overall engine performance. In typical modern engine applications the gas path temperatures within the turbine exceed the melting point of the component constituent materials. As such, conventional configurations extract dedicated cooling air from the compressor to cool gas path components in the turbine incurring significant cycle penalties especially when cooling is utilized in the low pressure turbine (sometimes also referred to as the power turbine).

The amount of cooling air needed over the mission of the aircraft is typically calculated and sized based off a single worst-case operating point. The severity of this operating point is further exacerbated by assuming that the over-all engine performance is based on a low probability stack up engine (typically referred to as a 2 sigma engine) at the end of the engine's service interval. Though this ensures adequate part durability performance over the life of the engine, it creates an over-arching performance drain.

A number of technologies exist that attempt to modulate the cooling flow to the turbine. These range from passive temperature driven systems that modulate the flow to a specific component to active system-style modulation devices. Some modulated cooling methods integrate active measurement of engine parameters such that at different exit compressor pressures and turbine exhaust temperature (or other parameters), the cooling may be modulated according to the predisposed working of the engine.

The blade exterior temperature can also be estimated based on measured cycle conditions and analysis-based constant cooling effectiveness and the coolant system modulated as a function of estimated blade thermal loading. This method in estimating turbine blade metal temperatures via mission parameters and constant cooling effectiveness as defined by:

$$phi = (Tgas - Tmetal)/(Tgas - Tcool)$$

This method has several shortfalls in that constant cooling effectiveness, especially with the implementation of thermal barrier coating (TBC), does not track linearly with blade heat loading.

It is commonly known that the effectiveness of TBC decreases in reducing over-all blade surface temperatures as the external heat loading parameters (such as external gas temperature or heat transfer coefficient) decrease.

There is a desire to determine real-time radially resolved temperature measurements from a turbine blade to be utilized in engine controls and operations.

BRIEF SUMMARY OF THE EMBODIMENTS

Disclosed and claimed herein are methods and devices for controlling a gas turbine engine. In one embodiment, a method for controlling a gas turbine engine based at least in part on real-time detection of spatially resolved temperature distribution of a turbine engine component includes detecting surface temperature of one or more blade elements, by an thermal probe, in a plurality of radial locations of an airfoil row to determine real-time spatially resolved surface temperature data for the one or more blade elements of the airfoil row. The method also includes controlling the engine based on the real-time spatially resolved surface temperature data.

In another embodiment, a gas turbine engine includes variable fan nozzles, variable turbine vanes, and at least one thermal probe configured to detect surface temperature of one or more blade elements in a plurality of radial locations of an airfoil row to determine real-time spatially resolved surface temperature data for the one or more blade elements of the airfoil row. The gas turbine engine also includes a control unit configured to control the engine based on the real-time spatially resolved surface temperature data.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 1 depicts a simplified engine system diagram according to one or more embodiments;

FIG. 2 depicts a method for controlling an engine according to one or more embodiments;

DETAILED DESCRIPTION OF THE EXEMPLARY EMBODIMENTS

Overview and Terminology

Figure 3A:
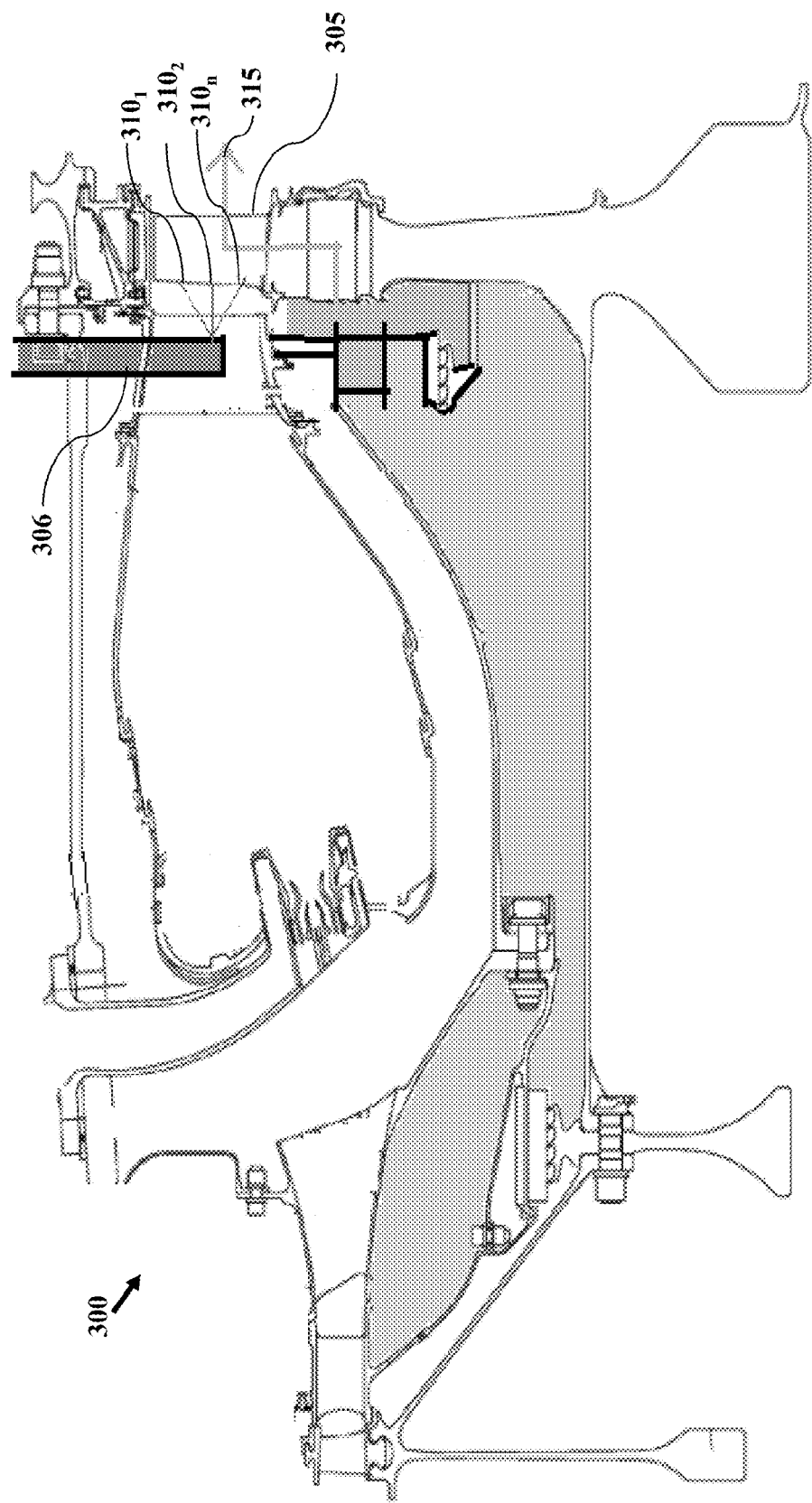
FIGS. 3A-3B depict gas turbine engine diagrams according to one or more embodiments.

One aspect of the disclosure relates to utilizing real-time radially resolved temperature measurements from a turbine engine component to be utilized in engine controls and operations.

In one embodiment, a method is provided for controlling a gas turbine engine based at least in part on spatially resolved temperature distribution of a turbine engine component including rotating airfoil components. Spatially resolved real-time radial temperature data may be detected for life limiting components (e.g., turbine airfoil, etc.) of an engine, such as a variable cycle engine. Variable cycle engines can allow a single architecture to operate at numerous design points at optimal efficiency. Engine control as discussed herein may be applied numerous configurations, such as variable bypass that utilize adjustments to core stream metering flow area (FP). In one embodiment, adjustments to core stream metering flow area (FP) can be accomplished by rotating static airfoils of a vane stage or adjustment of the stream endwall radii to adjust minimum flow area of the engine. In other embodiments, variable cycle configurations can utilize multiple streams (such as a third bypass stream) where the bypass ratio is changed through the alteration of the balance between the second and third engine streams. The variability in engine operations allows multiple solutions in terms of engine settings for a given thrust/sfc demand.

According to another embodiment, a method for controlling a gas turbine engine based at least in part on spatially resolved temperature distributions determined for a rotating turbine may include control of cooling modulation. Cooling modulation may be controlled by leveraging airfoil temperature measurements in real-time during engine operation. An engine control unit may be configured with engine control logic to control airfoil cooling flow. Control may be based on determination of fuel burn reduction over the entirety of the mission, and/or integrated temperature of the turbine section. Temperature modulation control may be provided by assessing prior mission damage accumulation and control of other aspects of the engine.

According to certain embodiments, turbine blade temperatures may be determined during operation of an engine. In one embodiment, temperature probes, such as pyrometers, may be employed to measure coated blade temperatures with optical sensor housings for probes. The measurement of coated blades may employ long-wave infrared sensors to capture measurements.

According to another embodiment, a gas turbine engine is provided including an engine control unit configured to control an engine based on determine real-time radial temperature data.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a simplified engine system diagram according to one or more embodiments. Engine system 100 is a simplified representation of one or more components of a gas turbine engine. Engine system 100 includes engine control unit 105, compressor section 110 and turbine section 115. According to one embodiment, engine system 100 relates to a gas engine turbine having variable fan nozzles, variable turbine vanes, and at least one thermal probe configured to detect radial temperature of one or more blade elements.

As shown in FIG. 1, compressor section 110 may include one or more variable fan nozzles 111. Similarly, turbine section 115 includes one or more variable turbine vanes 120 and one or more thermal probes $125_{1-n}$. Engine control unit 105 may be configured to control variable fan nozzles 111 and variable turbine vanes 120 based on real-time radial temperature data detected by thermal probes $125_{1-n}$. According to one embodiment, thermal probes $125_{1-n}$ may be configured to detect radial temperature of one or more airfoil elements in a plurality of radial locations of an airfoil row to determine real-time radial temperature data for the one or more airfoil elements of the airfoil row. Blade elements as used herein refer to one or more bladed components or a turbine section of a gas turbine engine. An airfoil row may be one or more blade elements associated with a particular stage of the turbine section 115. However, it should be appreciated that the thermal probes described herein may apply to other portions of a gas turbine engine and/or be used for other devices and measurement applications.

In certain embodiments, engine control unit 105 may additionally receive data from one or more additional sensors, shown as optional sensors 130. In certain embodiments, thermal probes or sensor components outside the turbine section may be provided to the engine control unit 105 to supplement determined temperature data.

FIG. 2 depicts a method for controlling an engine according to one or more embodiments. According to one embodiment, process 200 may be employed to control a gas turbine engine, and in particular may be employed to control a gas turbine engine based at least in part on radial temperature detection of a rotating turbine. Process 200 may be employed to control a variable cycle engine. According to another embodiment, process 200 may be performed by an engine control unit (e.g., engine control unit 105).

Process 200 may be initiated at block 205 by detecting the radial temperature distribution of a turbine airfoil. In certain embodiments, detecting at block 205 may include detecting surface temperature of one or more blade elements, by an thermal probe, in a plurality of radial locations of an airfoil row to determine real-time spatially resolved surface temperature data for the one or more blade elements of the airfoil row. By way of example, radial temperature may be detected for one or more blade elements by a thermal probe. The radial temperature may be detected at block 205 in a plurality of radial locations of a airfoil row to determine real-time radial temperature data for the one or more blade elements of the airfoil row. According to one embodiment, the thermal probe is disposed within the vane pack. The thermal probe may be one of a pyrometer probe, a long wavelength infrared (LWIR) probe and radially scanning probe. Temperature may be detected by a single probe, or a plurality of non-invasive thermal probes. Each probe may be axially and radially disposed within an up-stream vane row. According to another embodiment, detection at block 205 may be by a thermal probe configured to traverse blade elements by one or more of an articulating lens, traversing probe, and multiple probes in different circumferential locations around preceding vane row. The thermal probe can measure blade leading edge temperature in a plurality of radial locations. At block 205, one or more radial temperatures detected from a rotating turbine are measured and transmitted to an engine control system.

At block 210, the control unit determines control output for an engine. Control unit may control an engine at block 210 based on the real-time spatially resolved surface temperature data. Control output may be determined based on one or more radial temperatures detected from a rotating turbine. Control output may include one or more control signals for controlling operation of one or more parts of a gas turbine engine, such as a variable cycle turbine engine. According to one embodiment, determining control output may include determining a running average of time at a designated temperature and calculating a part life fraction used based on the running average. Determining control output may include the application of temperature data from calculated deterioration data or for deterioration rate based on other engine parameters for use as a variable to adjust engine parameters in a variable cycle engine. Control output data determined at block 215 may adjust one or more of the following parameters: bypass ratio of a singular fan stream or plurality of fan streams; modulation of turbine cooling flow; exit fan area; turbine vane flow area; fuel flow rate; compressor variable static vane scheduling; work balance between turbine stages; afterburner scheduling; secondary flow system bypass air; rotor pressure balance; and core flow variable nozzle area.

The control unit may control the engine at block 215. Controlling the engine may be based on the real-time radial temperature data. In one embodiment, controlling the engine at block 125 includes determining section average temperature calculated based on leading edge temperature measurements, and determining creep damage based on section average temperature. According to another embodiment, controlling the engine at block 215 includes determining maximum oxidation damage during engine operation for each span.

Controlling the engine at block 215 may include modulation of cooling on a row-by-row basis, wherein the control of turbine vane staging and cooling flow are modulated to shift the work split between the two turbine stages based on operating need or blade life fraction.

Figure 3B:
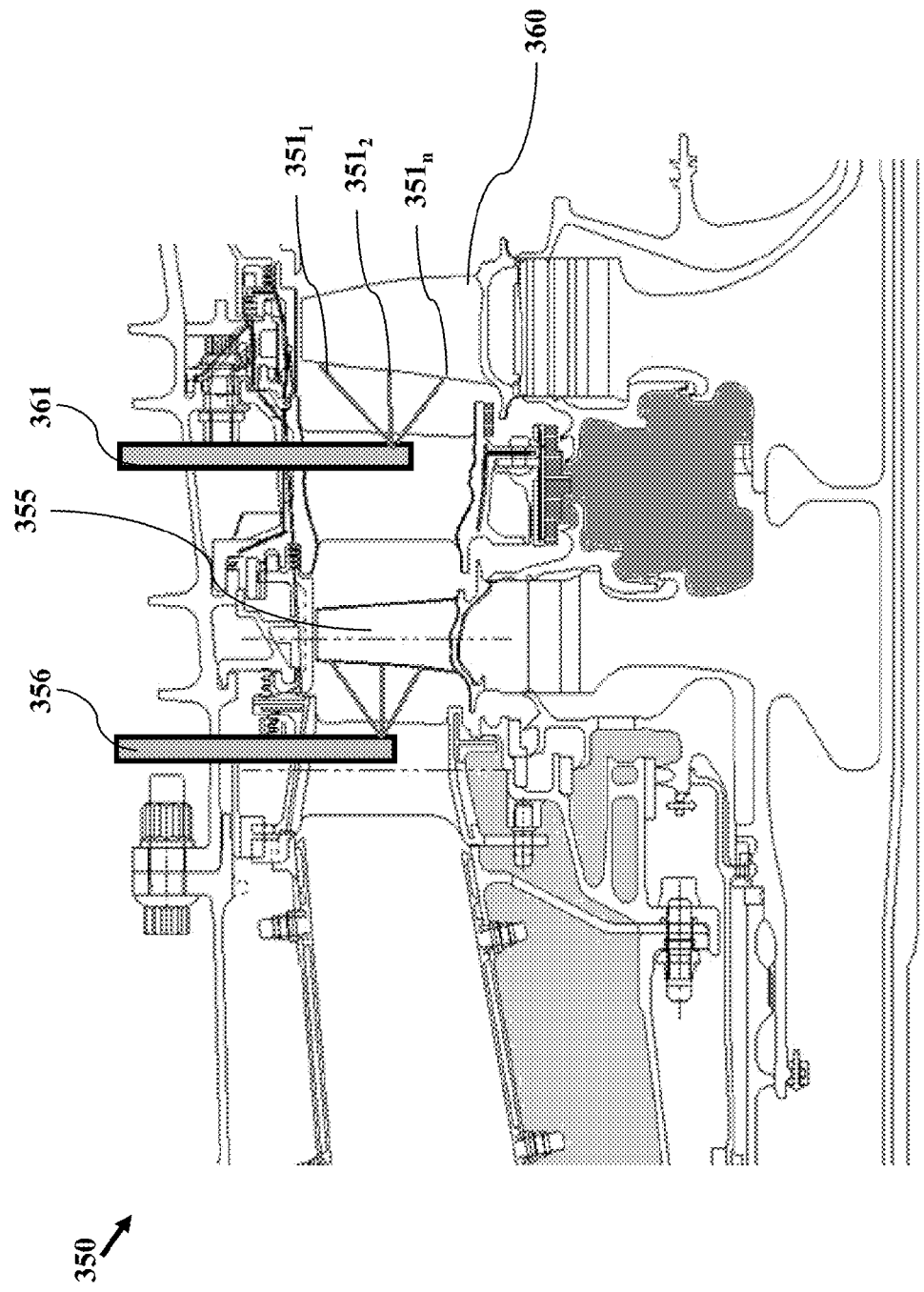

FIGS. 3A-3B depict gas turbine engine diagrams according to one or more embodiments. Gas turbine engine 300 includes blade 305 and probe 306. According to one embodiment, probe 306 is a radially scanning probe. Probe 306 may detect radial temperature of one or more blade elements. The radial temperature may be detected in a plurality of radial locations $310_{1-n}$ of an airfoil row, such as blade 305 to determine real-time radial temperature data for the one or more blade elements of the airfoil row. According to one embodiment, the thermal probe is disposed within the vane pack, and the thermal probe is a one of a pyrometer probe, a long wavelength infrared (LWIR) probe and radially scanning probe. Temperature may be detected by a single probe, or a plurality of non-invasive thermal probes. Each probe may be axially and radially disposed within an up-stream vane row. According to another embodiment, detection by thermal probe 306 may traverse blade elements by one or more of an articulating lens, traversing probe, and multiple probes in different circumferential locations around preceding vane row.

Probe 306 measures the blade leading edge temperature in a plurality of radial locations $310_{1-n}$ and transmits them back to the engine control computer. According to one embodiment, blade 305 is the first high pressure blade behind the combustor.

FIG. 3A depicts cooling flow 315 of the cooling flow modulation control within the inducer of the blade supply system. According to one embodiment, probe 306 may be configured to provide active temperature monitoring with a modulated cooling system, the modulation in the inducer of the gas turbine engine.

Referring now to FIG. 3B, gas turbine engine 350 includes blades 355 and 360 with active temperature monitoring of multiple stages. Probes 356 and 361 may be configured to monitor temperature of blades 355 and 360, respectively. Probes 356 and 361 may allow for an arrangement of multiple probes for multiple stages. The radial temperature may be detected in a plurality of radial locations, such as $351_{1-n}$ of blade 360 in an airfoil row pack in different circumferential locations around the preceding airfoil row.

Figure 4:
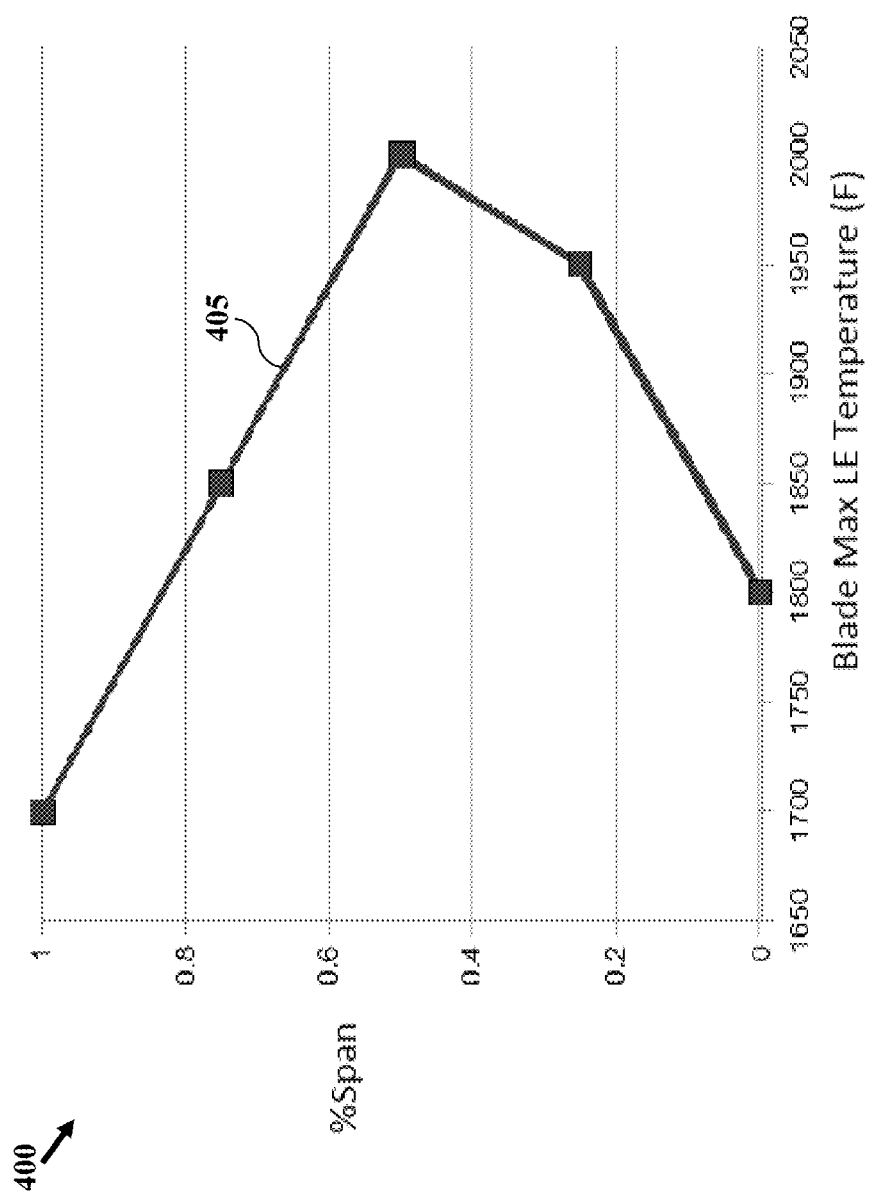
FIG. 4 depicts a graphical representation of radial temperature.

FIG. 4 depicts a graphical representation of a radial temperature profile. As shown in FIG. 4, graph 400 presents temperature profile 405, the temperature profile presenting the variation of blade max leading edge temperature in the radial direction. Temperature profile 405 is represented by the percentage span of a blade component relative to maximum blade temperature. According to one embodiment, determination of temperature profile 405 may be employed to calculate creep damage and/or maximum oxidation damage. Creep damage may be determined based on section average temperature (calculated based on leading edge temperature measurements). Maximum oxidation damage may be determined during engine operation for each span. As the engine speed and operating parameters in a variable cycle engine change, the radial temperature profile exiting the combustor may shift.

Figure 5:
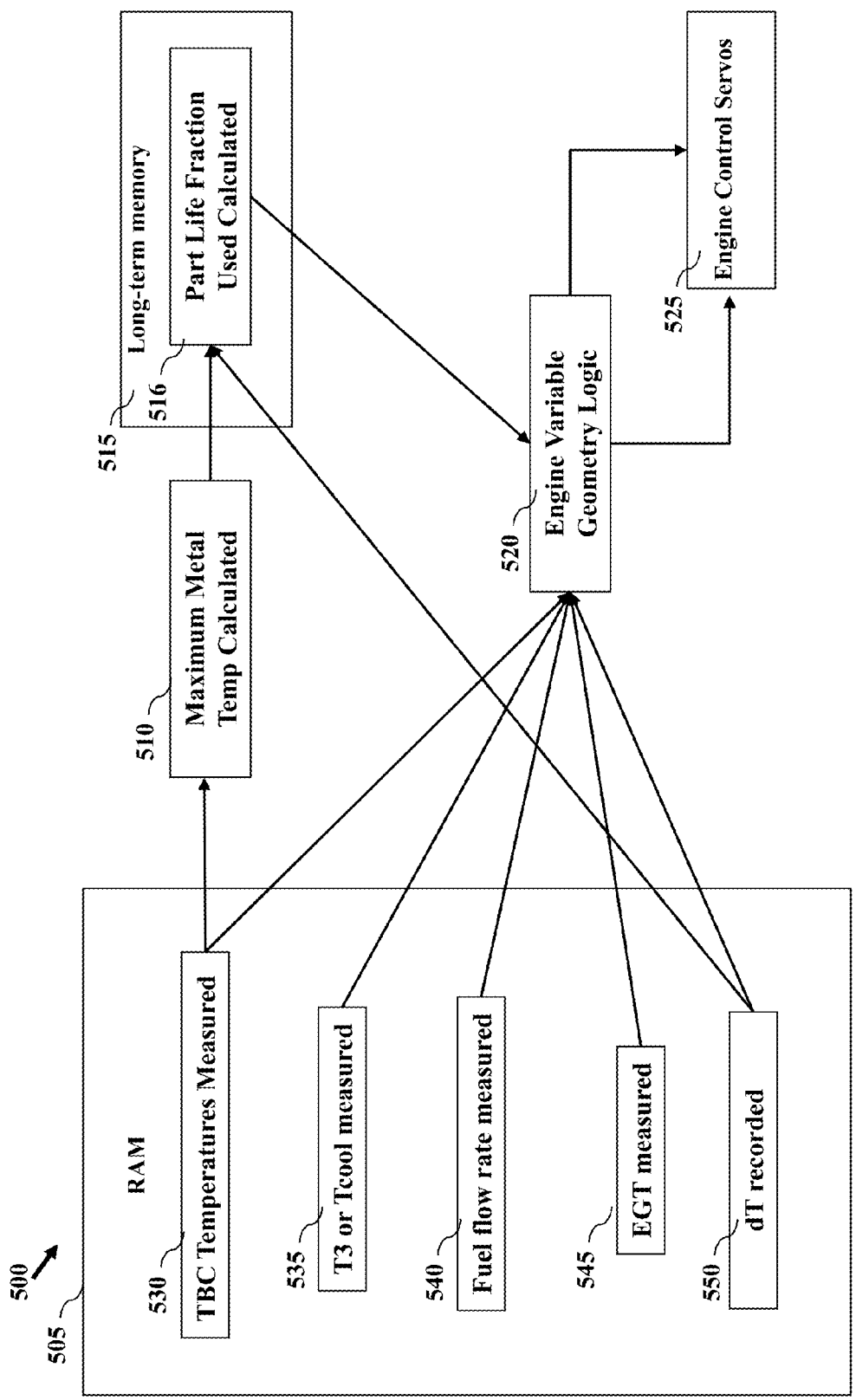
FIG. 5 depicts engine control logic according to one or more other embodiments.

Referring now to FIG. 5, a graphical representation of engine control logic is depicted according to one or more embodiments. Engine control logic 500 may be configured to control variable cycle engines based on determined blade temperature. Engine control logic 500 may be based on one or more parameters. In FIG. 5, engine control logic 500 includes RAM (Random Access Memory) parameters 505, maximum metal temperature calculation parameters 510, long term memory parameters 515, engine variable geometry logic parameters 520, and engine control services parameters 525. Engine control logic 500 may be executed to determine the blade leading edge temperature in a plurality of radial locations and control engine operation.

RAM (Random Access Memory) parameters 505 may store one or more values for TBC temperatures measured 530, T3 or Tcool measured 535, Fuel Flow rate measured 540, EGT measured 545, and dT recorded 550. Based on or more of the aforementioned parameters, maximum metal temperature calculation parameters 510 may be determined. Long term memory parameters 515 may include parameters for part life fraction used calculated 516. Part life fraction used calculated 516 parameters may be determined based on maximum metal temperature calculation parameters 510 calculated over a period of time and/or parameters stored by RAM 505.

Engine variable geometry logic parameters 520 may be determined based on parameters stored in RAM 505 and parameters for part life fraction used calculated 516. Engine control servos 525 may be controlled by output of engine variable geometry logic parameters 520.

Figure 6:
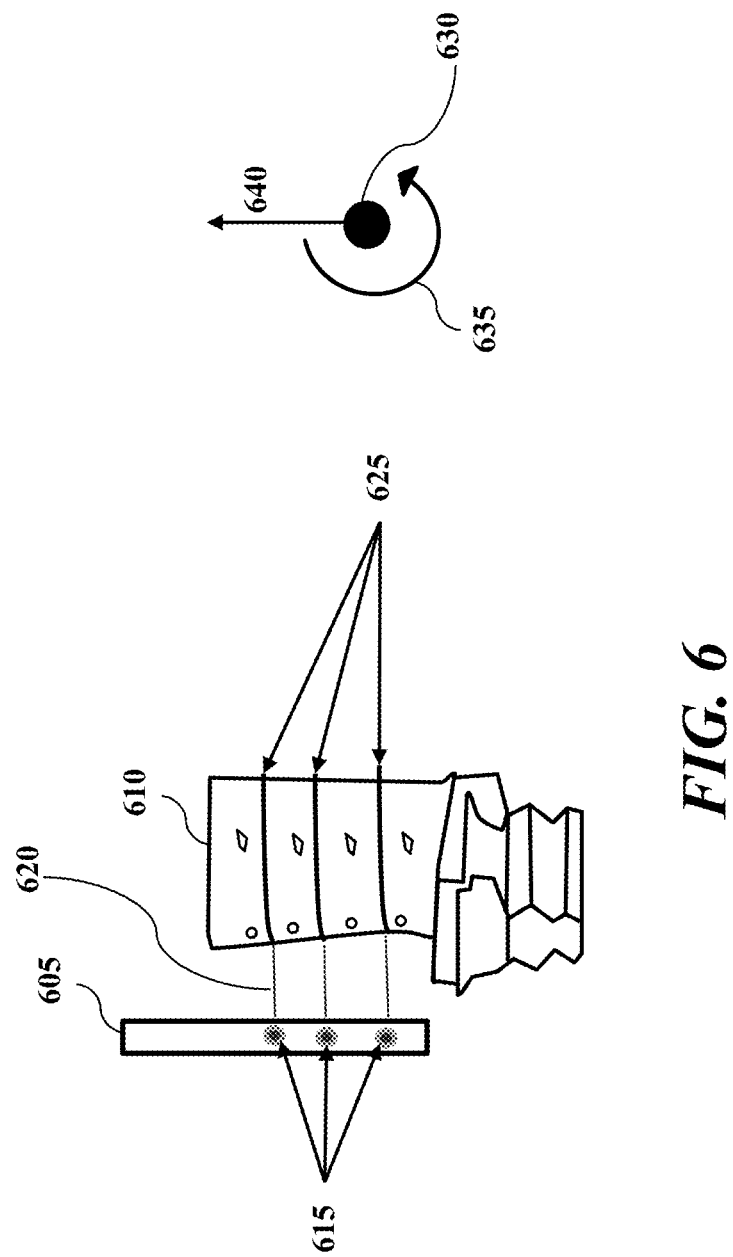
FIG. 6 depicts a graphical representation of spatially resolved surface temperature detection of a blade element according to one or more embodiments.

Referring now to FIG. 6, a graphical representation is depicted of spatially resolved surface temperature detection of a blade element. According to one embodiment, probe 605 may be configured to detect surface temperature of one or more blade elements, such as blade element 610. In one embodiment, probe 605 is a stationary thermal probe including a plurality of temperature sensors shown as 615.

According to one embodiment, probe 605 may be configured to detect temperature in a plurality of radial locations of an airfoil row to determine spatially resolved surface temperature data for the one or more blade elements, such as blade element 610, of the airfoil row. Spatially resolved temperature measurements could include 1D-to-3D measurements.

According to one embodiment, probe 605 remains stationary with respect to a rotating blade, such as blade element 610. Probe 605 may be configured with one or more point temperature sensors 615 that receive a beam, shown as 620, that measures temperature from a discrete location of blade element 610. The rotation of the blade 610 turns the point temperature measurement of the temperature sensor into a linear scan shown as 625. The radial distribution of these linear scans allows for spatially resolved measurement of the blade surface of blade element 610. According to one embodiment, linear scans may provide surface temperature of one or more blade elements. In FIG. 6, three point temperature sensors 615 are shown, however, it may be appreciated that additional or fewer point sensors may be employed.

According to one embodiment, engine axis rotation for blade element 610 is shown as engine axis rotation 630 with rotation direction 635. According to one embodiment, the radial direction of linear scans is shown as 640.

While this disclosure has been particularly shown and described with references to exemplary embodiments thereof, it will be understood by those skilled in the art that various changes in form and details may be made therein without departing from the scope of the claimed embodiments.

What is claimed is:

1. A method for controlling a gas turbine engine based at least in part on real-time detection of spatially resolved temperature distribution of a turbine engine component, the method comprising the acts of:
    detecting surface temperature of one or more blade elements, by a thermal probe, in a plurality of radial locations of an airfoil row to determine real-time spatially resolved surface temperature data for the one or more blade elements of the airfoil row; and
    controlling the engine based on the real-time spatially resolved surface temperature data, wherein controlling the engine includes determining section average temperature for the gas turbine engine based on a leading edge temperature of the one or more blade elements, and determining creep damage based on section average temperature.

2. The method of claim 1, wherein the thermal probe is disposed within the airfoil row, and the thermal probe is a one of a pyrometer probe, a long wavelength infrared (LWIR) probe and radially scanning probe.

3. The method of claim 1, wherein the temperature is detected by one of a single probe and a plurality of non-invasive thermal probes, wherein each probe is axially and radially disposed within an up-stream vane row.

4. The method of claim 1, wherein the thermal probe is configured to traverse blade elements by one or more of an articulating lens, traversing probe, and multiple probes in different circumferential locations around preceding vane row.

5. The method of claim 1, wherein the engine is a variable cycle engine.

6. The method of claim 1, wherein a plurality of radial temperatures from a rotating turbine are measured and transmitted to an engine control system.

7. The method of claim 1, wherein controlling the engine includes determining maximum oxidation damage during engine operation for each span.

8. The method of claim 1, wherein the thermal probe measures blade leading edge temperature in a plurality of radial locations and transmits measured temperatures to an engine control unit.

9. The method of claim 1, further comprising determining a running average of time at designated a temperature and calculating a part life fraction used based on the running average.

10. The method of claim 1, wherein controlling the engine is additionally based on one or more of:
    Bypass ratio of a singular fan stream or plurality of fan streams; Modulation of turbine cooling flow;
    Exit fan area;
    Turbine vane flow area;
    Fuel flow rate;
    Compressor variable static vane scheduling;
    Work balance between turbine stages;
    Afterburner scheduling;
    Secondary flow system bypass air;
    Rotor pressure balance; and
    Core flow variable nozzle area.

11. The method of claim 1, further comprising modulation of cooling on a row-by- row basis, wherein a control of turbine vane staging and cooling flow are modulated to shift a work split between the two turbine stages based on operating need or blade life fraction.

12. A gas turbine engine comprising:
    variable fan nozzles;
    variable turbine vanes;
    at least one thermal probe configured to detect surface temperature of one or more blade elements in a plurality of radial locations of an airfoil row to determine real-time spatially resolved surface temperature data for the one or more blade elements of the airfoil row; and
    a control unit configured to control the engine based on the real-time spatially resolved surface temperature data, wherein the control of the engine includes determining section average temperature for the gas turbine engine based on a leading edge temperature of the one or more blade elements, and determining creep damage based on section average temperature.

13. The gas turbine engine of claim 12, wherein the thermal probe is disposed within the vane pack, and the thermal probe is a one of a pyrometer probe, a long wavelength infrared (LWIR) probe and radially scanning probe.

14. The gas turbine engine of claim 12, wherein the temperature is detected by one of a single probe and a plurality of non-invasive thermal probes, wherein each probe is axially and radially disposed within an up-stream vane row.

15. The gas turbine engine of claim 12, wherein the thermal probe is configured to traverse blade elements by one or more of an articulating lens, traversing probe, and multiple probes in different circumferential locations around a preceding vane row.

16. The gas turbine engine of claim 12, wherein the engine is a variable cycle engine.

17. The gas turbine engine of claim 12, wherein a plurality of radial temperatures from a rotating turbine are measured and transmitted to an engine control system.

18. The gas turbine engine of claim 12, wherein controlling the engine includes determining maximum oxidation damage during engine operation for each span.

19. The gas turbine engine of claim 12, wherein the thermal probe measures blade leading edge temperature in a plurality of radial locations and transmits measured temperatures to an engine control unit.

20. The gas turbine engine of claim 12, wherein the control unit is configured to determine a running average of time at designated a temperature and calculating a part life fraction used based on the running average.

21. The gas turbine engine of claim 12, wherein the control unit is configured to control the engine based on one or more of:

Bypass ratio of a singular fan stream or plurality of fan streams;
   Modulation of turbine cooling flow;
   Exit fan area;
   Turbine vane flow area;
   Fuel flow rate;
   Compressor variable static vane scheduling;
   Work balance between turbine stages;
   Afterburner scheduling;
   Secondary flow system bypass air;
   Rotor pressure balance; and
   Core flow variable nozzle area.

22. The gas turbine engine of claim 12, wherein the control unit is further configured to modulate cooling on a row-by-row basis, wherein a control of turbine vane staging and cooling flow are modulated to shift a work split between the two turbine stages based on operating need or blade life fraction.

\* \* \* \* \*